United States Patent [19]
Crandall

[11] Patent Number: 6,154,542
[45] Date of Patent: Nov. 28, 2000

[54] METHOD AND APPARATUS FOR SIMULTANEOUSLY ENCRYPTING AND COMPRESSING DATA

[75] Inventor: Richard E. Crandall, Portland, Oreg.

[73] Assignee: Apple Computer, Inc., Cupertino, Calif.

[21] Appl. No.: 08/992,683

[22] Filed: Dec. 17, 1997

[51] Int. Cl.[7] .............................. H04K 1/60; H04L 9/00
[52] U.S. Cl. .............................. 380/28; 380/269; 380/45
[58] Field of Search ................................ 380/28, 45, 269; 705/51

[56] References Cited

U.S. PATENT DOCUMENTS

| | | | |
|---|---|---|---|
| 4,386,416 | 5/1983 | Giltner et al. | 364/900 |
| 5,159,632 | 10/1992 | Crandall | 380/28 |
| 5,199,069 | 3/1993 | Barrett et al. | 380/28 |
| 5,237,614 | 8/1993 | Weiss | 380/23 |
| 5,271,061 | 12/1993 | Crandall | 380/28 |
| 5,315,655 | 5/1994 | Chaplin | 380/4 |
| 5,367,572 | 11/1994 | Weiss | 380/23 |
| 5,463,690 | 10/1995 | Crandall | 380/30 |
| 5,479,512 | 12/1995 | Weiss | 380/28 |
| 5,517,614 | 5/1996 | Tajima et al. | 395/180 |
| 5,768,372 | 6/1998 | Sung et al. | 380/3 |
| 5,915,017 | 6/1999 | Sung et al. | 380/3 |

OTHER PUBLICATIONS

Lelewer et al. Data Compression. ACM Computing Surveys. vol. 19 No. 3. pp. 286–288, Sep. 1987.

Michael Luby and Charles Rackoff, "How to Construct Pseudorandom Permutations from Pseudorandom Functions," *SIAM Journal on Computing*, 17:2 (1988) pp. 373–386.

Debra A. Lelewer and Daniel S. Hirschberg, "Data Compression," *ACM Computing Surveys*, 19:3 (Sep. 1997) pp. 261–296.

*Primary Examiner*—Pinchus M. Laufer
*Assistant Examiner*—Bryan Latham
*Attorney, Agent, or Firm*—Blakely, Sokoloff, Taylor & Zafman

[57] ABSTRACT

A method and apparatus for simultaneously encrypting and compressing data identifies an encryption key and uses the encryption key to identify one compression algorithm from a set of compression algorithms. The data is then compressed according to the one compression algorithm.

23 Claims, 6 Drawing Sheets

SOURCE DATA = FACED
KEY = 0011
OUTPUT = 5 0 2 5 4

| 400 | 0 | 1 | 2 | 3 | 4 | 5 | 6 |
|---|---|---|---|---|---|---|---|
| | A | B | C | D | E | F | G |

FIG. 4a

| 410 | 0 | 1 | 2 | 3 | 4 | 5 | 6 |
|---|---|---|---|---|---|---|---|
| | A | B | C | D | F | E | G |

FIG. 4b

| 420 | 0 | 1 | 2 | 3 | 4 | 5 | 6 |
|---|---|---|---|---|---|---|---|
| | A | B | C | D | F | E | G |

FIG. 4c

| 430 | 0 | 1 | 2 | 3 | 4 | 5 | 6 |
|---|---|---|---|---|---|---|---|
| | A | C | B | D | F | E | G |

FIG. 4d

| 440 | 0 | 1 | 2 | 3 | 4 | 5 | 6 |
|---|---|---|---|---|---|---|---|
| | A | C | E | B | D | F | G |

FIG. 4e

| 450 | 0 | 1 | 2 | 3 | 4 | 5 | 6 |
|---|---|---|---|---|---|---|---|
| | A | C | E | D | B | F | G |

FIG. 4f

SOURCE DATA = FACED
KEY = 1100
OUTPUT = 5 0 3 5 5

| 0 | 1 | 2 | 3 | 4 | 5 | 6 |
|---|---|---|---|---|---|---|
| A | B | C | D | E | F | G |

| 0 | 1 | 2 | 3 | 4 | 5 | 6 |
|---|---|---|---|---|---|---|
| A | B | F | C | D | E | G |

| 0 | 1 | 2 | 3 | 4 | 5 | 6 |
|---|---|---|---|---|---|---|
| A | B | F | C | D | E | G |

| 0 | 1 | 2 | 3 | 4 | 5 | 6 |
|---|---|---|---|---|---|---|
| A | B | C | F | D | E | G |

| 0 | 1 | 2 | 3 | 4 | 5 | 6 |
|---|---|---|---|---|---|---|
| A | B | C | F | E | D | G |

| 0 | 1 | 2 | 3 | 4 | 5 | 6 |
|---|---|---|---|---|---|---|
| A | B | D | C | F | E | G |

METHOD AND APPARATUS FOR SIMULTANEOUSLY ENCRYPTING AND COMPRESSING DATA

BACKGROUND OF THE INVENTION

1. Field of the Invention

The present invention pertains to data encryption and data compression. More particularly, this invention relates to simultaneously encrypting and compressing data.

2. Background

Data encryption has been a concern of individuals, businesses, and governments virtually since the development of the written word. More recently, data storage and data transfer over public pathways, such as the Internet, have resulted in an increased desire to be able to store and transfer data without its being recognized by other than a select group. However, ever-advancing computer technology has resulted in modern computer systems which are able to decrypt or "crack" codes and encryption schemes with increasing speed. Thus, secure encryption has become increasingly difficult.

Additionally, as the world has entered the "information age", an additional need which has arisen is that of data compression. Vast amounts of information are being stored and transferred daily. However, storage devices and communications paths in particular have not been able to keep up with the storage and transfer requirements of users. Thus, using various compression techniques, the data is stored in a smaller storage device or transferred in a shorter amount of time than uncompressed data.

However, one problem which exists with current compression and encryption methods is that of speed. Each additional processing step which is taken, such as compression and/or encryption, requires additional processing time by a computer system. Thus, additional time is required for the desired storage or data transfer to occur.

Thus, what is needed is an improved way to compress and encrypt data.

SUMMARY OF THE INVENTION

A method and apparatus for simultaneously encrypting and compressing data is disclosed herein. The present invention identifies an encryption key and uses the encryption key to identify one compression algorithm from a set of compression algorithms. The present invention then compresses the data according to the one compression algorithm.

BRIEF DESCRIPTION OF THE DRAWINGS

The present invention is illustrated by way of example and not limitation in the figures of the accompanying drawings, in which like references indicate similar elements and in which:

FIGS. 4a, 4b, 4c, 4d, 4e, and 4f illustrate an example of the compression process according to one embodiment of the present invention;

FIGS. 5a, 5b, 5c, 5d, 5e, and 5f illustrate another example of the compression process according to one embodiment of the present invention.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
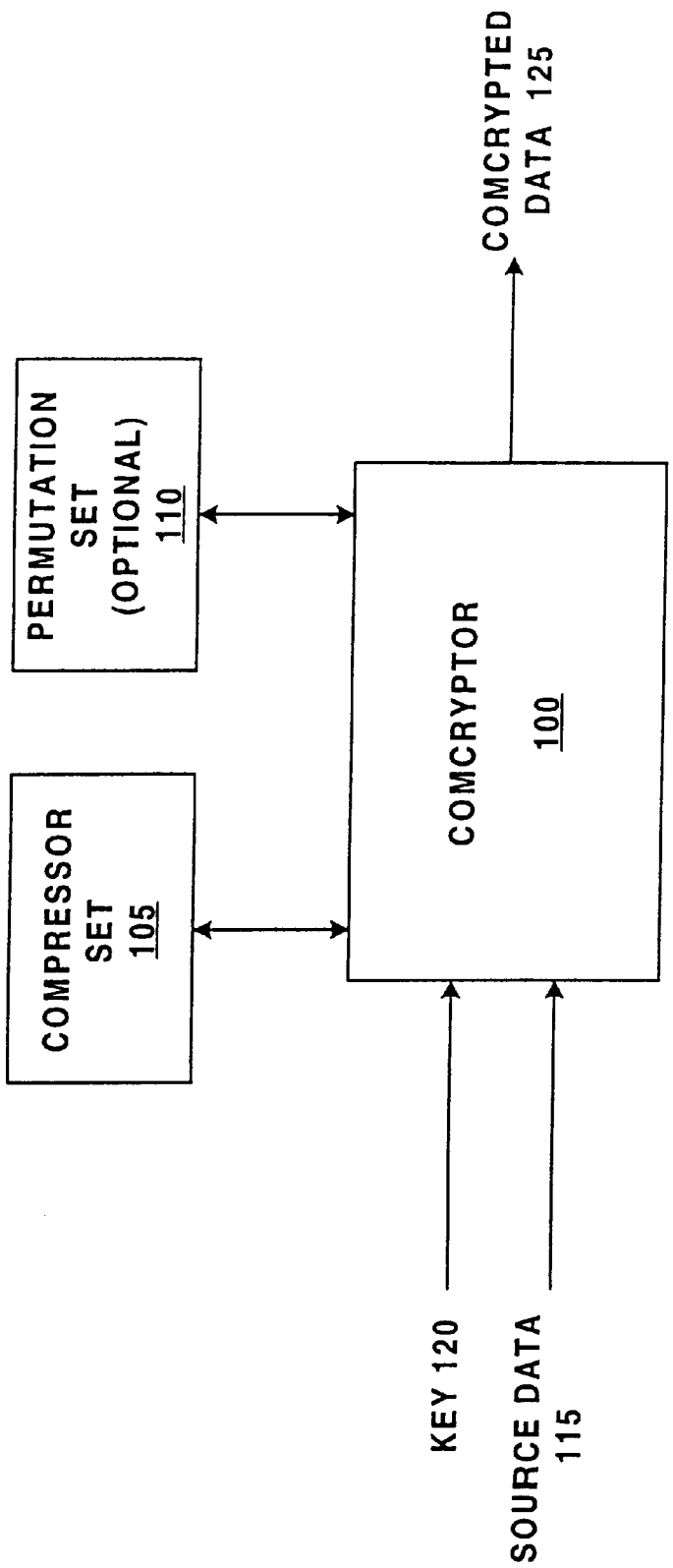
FIG. 1 is a block diagram illustrating a device for simultaneous data encryption and compression according to one embodiment of the present invention.

FIG. 1 is a block diagram illustrating a device for simultaneous data encryption and compression according to one embodiment of the present invention. A "comcryptor" 100, compressor set 105, and an optional permutation set 110 are illustrated. Comcryptor 100 performs simultaneous compression and encryption of input source data 115 based on input key 120. The output of comcryptor 100 is compressed and encrypted, referred to as "comcrypted", data 125.

Compressor set 105 includes multiple compression algorithms for use by comcryptor 100. According to one embodiment, a substantial number of compression algorithms are available as compressor set 105. Virtually any number of compression algorithms can be available as compressor set 105, however, typically at least two compression algorithms are available as compressor set 105. It should be noted that, generally, the comcryption of the present invention becomes more secure (i.e., the encrypted data is more difficult to decode without the key) as the number of compression algorithms available as compressor set 105 increases.

Which one of the multiple compression algorithms is used by comcryptor 100 is dependent on key 120. According to one embodiment of the present invention, at least some of the compression algorithms available to comcryptor 100 in compressor set 105 are variable bit stream compressors. A variable bit stream compressor provides an output where different input characters will be represented by different numbers of bits. Thus, two different characters being compressed are represented using different numbers of bits, such as "0" to represent the character "e" and "1011011" to represent the character "z".

Permutation set 110 includes multiple permutation algorithms for use by comcryptor 100. As discussed in more detail below, the permutation set 110 and the use of permutation by comcryptor 100 is optional. According to one embodiment, a substantial number of permutation algorithms are available as permutation set 110. Virtually any number of permutation algorithms can be available as permutation set 110. Which one of the multiple permutation algorithms is used by comcryptor 100 is dependent on key 120. Any of a wide variety of conventional permutation algorithms can be available as permutation set 110, such as those based on Luby-Rackoff permutation. For a further discussion of Luby-Rackoff permutation, the reader is referred to "How to construct pseudorandom permutations from pseudorandom functions", M. Luby & C. Rackoff, *SIAM Journal on Computing*, v. 17, no. 2 (1988), pp. 373–386.

Key 120 can be any multiple-bit key or password. Key 120 can be in numeric, alphabetic, or symbolic form, or any combination thereof. Alphanumerics and symbols are converted to a series of bits in any of a wide variety of conventional manners, such as using ASCII coding. Thus, a user is able to select a word, number, phrase, etc. which is easy for him or her to remember as the key, rather than requiring use of a lengthy prime number or similarly burdensome key.

Source data 115 is the input data which will be comcrypted by comcryptor 100. Source data 115 can be any type of data, including plain text data, data compressed or encrypted by another compression or encryption algorithm, image data, etc. In the illustrated embodiment, comcryptor 100 comcrypts source data 115 on a character-by-character basis. In alternate embodiments, comcryptor 100 comcrypts source data 115 on a multiple-character basis.

Figure 2:
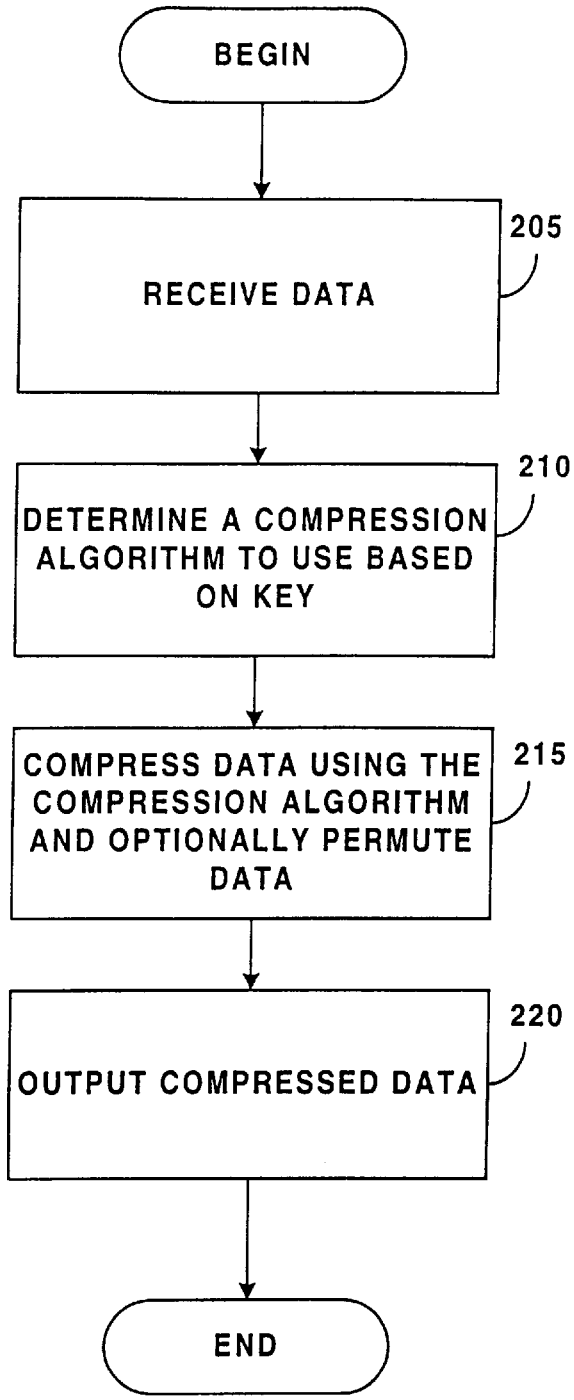
FIG. 2 is a flowchart illustrating the steps followed in simultaneously encrypting and compressing data according to one embodiment of the present invention.

FIG. 2 is a flowchart illustrating the steps followed in simultaneously encrypting and compressing data according to one embodiment of the present invention. A piece of data is first received, step 205. In the illustrated embodiment each piece of data is a multiple-character block of data, such as a two-character or three-character block. However, in alternate embodiments each piece of data can be larger, such as a sentence, paragraph, or other grouping of characters, or simply any multiple-bit (e.g., 8-bit or 16-bit) portion of input data, or smaller, such as a single character.

Upon receipt of the data, comcryptor 100 identifies a particular compression algorithm to use based on the key, step 210. Comcryptor 100 then compresses the data using that particular compression algorithm and optionally permutes the data, step 215. If permutation is performed, key 120 is used as an index into multiple permutation algorithms, thereby selecting one of the algorithms. Comcryptor 100 can use individual bits of key 120, or alternatively use multiple bits of key 120, to identify a particular permutation algorithm analogous to the selection of a particular compression algorithm, as discussed in more detail below. The selection of a compression algorithm, and optionally a permutation algorithm, based on key 120 is the encryption part of the present invention. Comcryptor 100 then outputs the compressed data, step 220. Thus, it can be seen that by using the key to identify a particular compression algorithm to be used, the data has been both compressed and encrypted simultaneously. Therefore, the compressed data output in step 220 is the comcrypted data.

Thus, as can be seen in the illustration of FIG. 2, source data is both encrypted and compressed in a single step, using a single combined encryption and compression process. By simultaneously encrypting and compressing, the present invention is able to compress and encrypt data faster than can be done performing encryption and compression separately. Furthermore, given the large number of compression algorithms available as compressor set 105 from which comcryptor 100 can select, and the ability to change the compression algorithm for each piece of data, comcryptor 100 provides a secure encryption process. Thus, the present invention is able to compress data and provide secure encryption in a smaller amount of time.

Decomcryption of comcrypted data is performed carrying out the reverse of the steps used in comcrypting the data. Given the key and the comcrypted data, a decomcryptor can identify the compression algorithm used to compress each piece of data, and thus is able to decompress the data using the appropriate decompression algorithm.

In the illustrated embodiment, each bit of key 120 is used to identify a compression algorithm for a particular character of data. According to an alternate embodiment of the present invention, a single bit is used to identify a compression algorithm for multiple characters of data. By way of example, key 120 could identify a particular compression algorithm to be used for an entire block of data, such as a paragraph of a text document or an entire text document.

According to one embodiment of the present invention, additional security can be obtained by further encrypting key 120 or comcrypted data 125. By way of example, key 120 or comcrypted data 125 can be encrypted prior to being transferred to the decomcrypting party using any of a wide variety of conventional encryption mechanisms. It is to be appreciated, however, that although such additional encryption increases the security of the data transfer, it also increases the time required to comcrypt and encrypt the data, as well as decrypt and decomcrypt the data upon receipt. Examples of such additional encryption methods include those found in U.S. Pat. Nos. 5,159,632, 5,271,061, and 5,463,690, as well as other methods such as well-known RSA algorithms.

According to one embodiment of the present invention, compressor set 105 of FIG. 1 includes multiple variations of a "move-forward" compression algorithm. The move-forward compression algorithm is a modification of the well-known BSTW compression algorithm. In standard BSTW compression, a stack of characters corresponding to the input data is kept, always moving a character to the front of the stack every time it appears in the input data. Given the state of the stack at the end of the compression process, a decompressor can re-compute the original data. Typically, the stack in BSTW compression includes the 256 characters used in ASCII coding. For a further discussion of BSTW compression, the reader is referred to Lelewer, D. A., and Hirschberg, D. S., *ACM Computing Surveys*, 3, 19, September, 1987.

In move-forward compression, a stack of characters corresponding to the input data is kept as in BSTW compression, however, every time a character appears in the input data it is moved forward in the stack to a position higher than its current position in the stack but not necessarily all the way to the top of the stack. According to one embodiment of the present invention, the stack includes 256 characters. Typical values from the stack size range from 256 to 65,536 elements, however, alternate embodiments can use larger or smaller stack sizes. According to one embodiment of the present invention, each entry or element in the stack is a multiple-character block of data, such as "ed", "ing", "the", etc. According to another embodiment of the present invention, each entry or element in the stack is a single-character block of data, such as "a", "b", "c", etc.

The equation for determining a new position in the stack for a character using move-forward compression is:

$$x = y - z \cdot y$$

where the top of the stack is position 0, x is the new position in the stack for the character, y is the current position in the stack of the character, and z is a variable ranging from zero to one indicating how far forward to move the character. It can be seen from this equation that the larger the value of z, the further forward the character is moved. As discussed in more detail below, the value of z can be assigned dynamically according to the bits of the key. It should be noted that, dependent on the values of y and z, the value of x may be a non-integer value. When x is a non-integer value, the value of x is rounded according to any one of a wide variety of rounding rules. For example, the integer floor of x could be used, taking the integer portion and dropping the decimal portion. In one implementation, the value of x is rounded up if the decimal portion of x is greater than a 0.50 cutoff value, and otherwise is rounded down. However, alternate implementations can use any other cutoff value ranging between zero and one.

Figure 3:
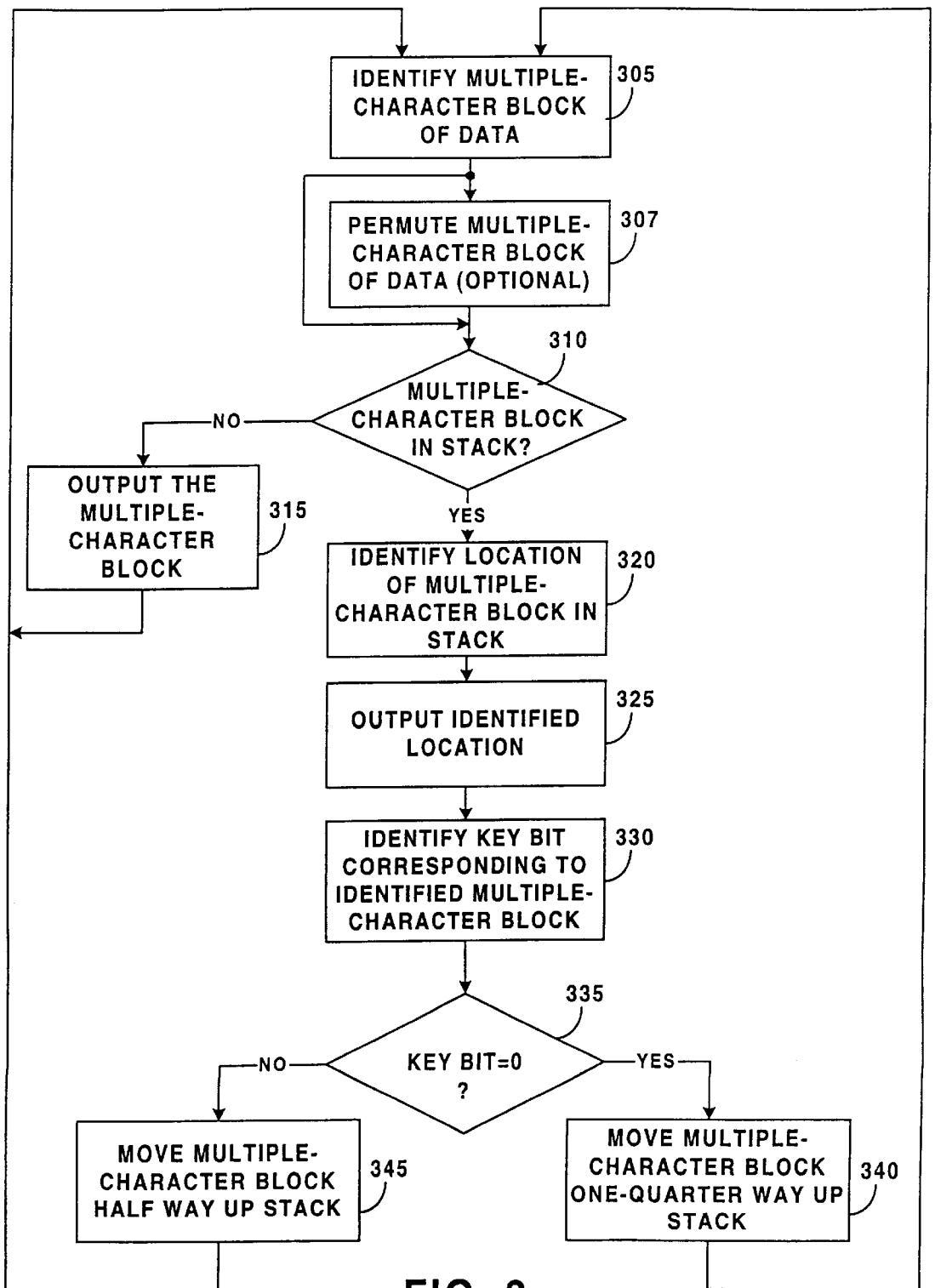
FIG. 3 is a flowchart illustrating the steps of selecting a move-forward compression algorithm and compressing data according to one embodiment of the present invention.

FIG. 3 is a flowchart illustrating the steps of selecting a move-forward compression algorithm and compressing data according to one embodiment of the present invention. Comcryptor 100 first identifies a particular multiple-character block of data, step 305. Comcryptor 100 then optionally permutes the multiple-character block of data, step 307. Thus, when this option is selected the manipulation of the stack is using permuted multiple-character blocks of data rather than the original source data.

Comcryptor 100 then checks whether the identified multiple-character block is in the stack, step 310. If the multiple-character block is not in the stack, then the actual characters of the block are output, step 315. However, if the identified multiple-character block is in the stack then the location of the block in the stack is identified, step 320, and the location is output as the compressed representation of the multiple-character block of data, step 325.

In the illustrated embodiment, an entropy-based encoder is used to encode the output stack locations and the actual characters of the block if the multiple-character block is not in the stack. The entropy-based encoder provides the variable bit stream output, with lower numerical stack locations requiring fewer bits. By way of example, the value "0" in the output stack locations requires fewer bits than the value "255" in the output stack locations. Any of a wide variety of conventional entropy-based encoding schemes can be used, such as the well-known Huffman encoding.

Comcryptor 100 then identifies the key bit corresponding to the identified multiple-character block, step 330, and checks whether the key bit is zero, step 335. If the key bit is zero, then comcryptor 100 moves the multiple-character block one-quarter of the way up the stack, step 340. However, if the key bit is not zero, then the multiple-character block is moved one-half of the way up the stack, step 345. The process then repeats with the next multiple-character block, step 305.

In the illustrated embodiment, different multiple-character blocks of source data 115 correspond to different bits of key 120. Typically, source data 115 includes many multiple-character blocks of data, such as an image or a text document. Source data 115 generally includes more multiple-character blocks than there are bits in key 120, so a single bit of key 120 corresponds to multiple blocks of source data 115. The first multiple-character block of data 115 corresponds to a predetermined bit of key 120, such as the first bit. The second multiple-character block of data 115 then corresponds to the next bit of key 120, which is the second bit if the predetermined bit is the first bit. This sequence continues until the end of key 120, at which point the process wraps around to the beginning of key 120. Thus, by way of example, if key 120 is a 128-bit key, then the $129^{th}$ multiple-character block of source data 115 corresponds to the first bit of key 120.

In an alternate embodiment of the present invention, multiple bits of key 120 are used to identify the compression algorithm for a particular multiple-character block rather than using a single bit. By using multiple bits, the number of compression algorithms which could be used to compress a particular multiple-character block increases. By way of example, if a four-bit portion of key 120 were to be used to identify a particular compression algorithm, then there would be $2^4$, or 16, different compression algorithms which could be used for each of the multiple-character blocks. Examples of these different compression algorithms include variations of the move-forward algorithm such as move forward by one-half, one-third, one-quarter, one-fifth, one-sixth, etc.

It should be noted that, if multiple bits of key 120 are used to identify the compression algorithm for a particular multiple-character block, then these sets of multiple bits can overlap. By way of example, bits 1, 2, 3, and 4 could be used to identify the compression algorithm for the first multiple-character block, bits 2, 3, 4, and 5 could be used to identify the compression algorithm for the second multiple-character block, etc. Alternatively, the sets of multiple bits can be non-overlapping. By way of example, bits 1, 2, 3, and 4 could be used to identify the compression algorithm for the first multiple-character block, bits 5, 6, 7, and 8 could be used to identify the compression algorithm for the second multiple-character block, etc.

In another embodiment of the present invention, further permutation of the output data occurs at step 325. For example, the output bytes from step 325 can be exclusive-ORed with bytes from the key and bytes from the identified location, or both.

In the examples below of FIGS. 4a–4f and 5a–5f, the compression process is illustrated using a stack of single characters rather than multiple-character blocks of data. It is to be appreciated that this is for ease of explanation only, and that the process applies analogously to multiple-character blocks of data.

FIGS. 4a, 4b, 4c, 4d, 4e, and 4f illustrate an example of the compression process according to one embodiment of the present invention. In the illustrated example, the source data stream is "FACED", and the key is the bit stream "0011". For ease of explanation, stacks 400, 410, 420, 430, 440, and 450 of FIGS. 4a, 4b, 4c, 4d, 4e, and 4f have been limited to seven characters each. It is to be appreciated that this limitation is only for ease of explanation, and that the stack can include any number of characters.

As illustrated, the first character of the source data stream is "F". The character "F" has a location of 5 in stack 400, so comcryptor 100 outputs the value 5. The first character in the source data stream corresponds to the first bit of the key, which is a "0". Following the embodiment of FIG. 3 above the key bit being a "0" indicates to move the character one-quarter of the way up the stack. One-quarter of 5 is 1.25, which rounds to an integer value of 1. So, the character "F" is moved up 1 location in the stack to position 4, as illustrated in stack 410 of FIG. 4b.

The next character of the source data stream is "A". The character "A" has a location of 0 in stack 410, so comcryptor 100 outputs the value 0. The second character in the source data stream corresponds to the second bit of the key, which is a "0". The key bit being a "0" indicates to move the character one-quarter of the way up the stack. One-quarter of 0 is 0, so the character "A" is moved up 0 locations in the stack to position 0, as illustrated in stack 420 of FIG. 4c.

The next character of the source data stream is "C". The "C" has a location of 2 in stack 420, so comcryptor 100 outputs the value 2. The third character in the source data stream corresponds to the third bit of the key, which is a "1". Following the embodiment of FIG. 3 above, the key bit being a "1" indicates to move the character one-half of the way up the stack. One-half of 2 is 1. Thus, the character "C" is moved up 1 location in the stack to position 1, as illustrated in stack 430 of FIG. 4d.

The next character of the source data stream is "E". The "E" has a location of 5 in stack 430, so comcryptor 100 outputs the value 5. The fourth character in the source data stream corresponds to the fourth bit of the key, which is a "1", which indicates to move the character one-half of the way up the stack. One-half of 5 is 2.5, which rounds to an integer value of 3, so the character "E" is moved up 3 locations in the stack to position 2, as illustrated in stack 440 of FIG. 4e.

The last character of the source data stream is "D". The "D" has a location of 4 in stack 440, so comcryptor 100 outputs the value 4. Because the key only has four bits, the fifth character in the source data stream "wraps around" the key and corresponds to the first bit of the key, which is a "0". The "0" indicates to move the character one-quarter of the way up the stack. One-quarter of 4 is 1, so the character "D" is moved up 1 location in the stack to position 3, as illustrated in stack 450 of FIG. 4f.

As discussed above, the output stack locations (5, 0, 2, 5, and 4) are also encoded using an entropy-based encoder to provide a variable bit stream comcrypted data output.

FIGS. 5a, 5b, 5c, 5d, 5e, and 5f illustrate another example of the compression process according to one embodiment of the present invention. In the illustrated example, the source data stream is "FACED", and the key is the bit stream "1100". For ease of explanation, stacks 500, 510, 520, 530, 540, and 550 of FIGS. 5a, 5b, 5c, 5d, 5e, and 5f have been limited to seven characters each. It is to be appreciated that this limitation is only for ease of explanation, and that the stack can include any number of characters.

As illustrated, the first character of the source data stream is "F". The character "F" has a location of 5 in stack 500, so comcryptor 100 outputs the value 5. The first character in the source data stream corresponds to the first bit of the key, which is a "1". Following the embodiment of FIG. 3 above, the key bit being a "1" indicates to move the character one-half of the way up the stack. One-half of 5 is 2.5, which rounds to an integer value of 3. So, the character "F" is moved up 3 locations in the stack to position 2, as illustrated in stack 510 of FIG. 5b.

The next character of the source data stream is "A". The character "A" has a location of 0 in stack 510, so comcryptor 100 outputs the value 0. The second character in the source data stream corresponds to the second bit of the key, which is a "1". The key bit being a "1" indicates to move the character one-half of the way up the stack. One-quarter of 0 is 0, so the character "A" is moved up 0 locations in the stack to position 0, as illustrated in stack 520 of FIG. 5c.

The next character of the source data stream is "C". The "C" has a location of 3 in stack 520, so comcryptor 100 outputs the value 3. The third character in the source data stream corresponds to the third bit of the key, which is a "0". Following the embodiment of FIG. 3 above, the key bit being a "0" indicates to move the character one-quarter of the way up the stack. One-quarter of 3 is 0.75, which rounds to an integer value of 1. Thus, the character "C" is moved up 1 location in the stack to position 2, as illustrated in stack 530 of FIG. 5d.

The next character of the source data stream is "E". The "E" has a location of 5 in stack 530, so comcryptor 100 outputs the value 5. The fourth character in the source data stream corresponds to the fourth bit of the key, which is a "0", which indicates to move the character one-quarter of the way up the stack. One-quarter of 5 is 1.25, which rounds to an integer value of 1, so the character "E" is moved up 1 location in the stack to position 4, as illustrated in stack 540 of FIG. 5e.

The last character of the source data stream is "D". The "D" has a location of 5 in stack 540, so comcryptor 100 outputs the value 5. Because the key only has four bits, the fifth character in the source data stream "wraps around" the key and corresponds to the first bit of the key, which is a "1". The "1" indicates to move the character one-half of the way up the stack. One-half of 5 is 2.5, which rounds to the integer value of 3, so the character "D" is moved up 3 locations in the stack to position 2, as illustrated in stack 550 of FIG. 5f.

As discussed above, the output stack locations (5, 0, 3, 5, and 5) are also encoded using an entropy-based encoder to provide a variable bit stream comcrypted data output.

Thus, as illustrated in FIGS. 3, 4a–4f, and 5a–5f, comcryptor 100 of FIG. 1 uses the bits of key 120 to identify a particular compression algorithm from compressor set 105 for characters of source data 115. In the examples of FIGS. 4a–4f and 5a–5f, only two compression algorithms are available in compressor set 105. These examples have been limited to two compression algorithms for ease of explanation; alternate embodiments of the present invention include substantially larger numbers of compression algorithms.

Furthermore, in the embodiment of FIGS. 3, 4a–4f, and 5a–5f, the values of the bits of key 120 are used to identify the value of a variable in a move-forward compression algorithm. In an alternate embodiment, the entire key is used to identify a particular one algorithm from compressor set 105 to be used for all of source data 1 15. Thus, an m-bit key would uniquely identify one of $2^m$ compression algorithms from compressor set 105.

Figure 6:
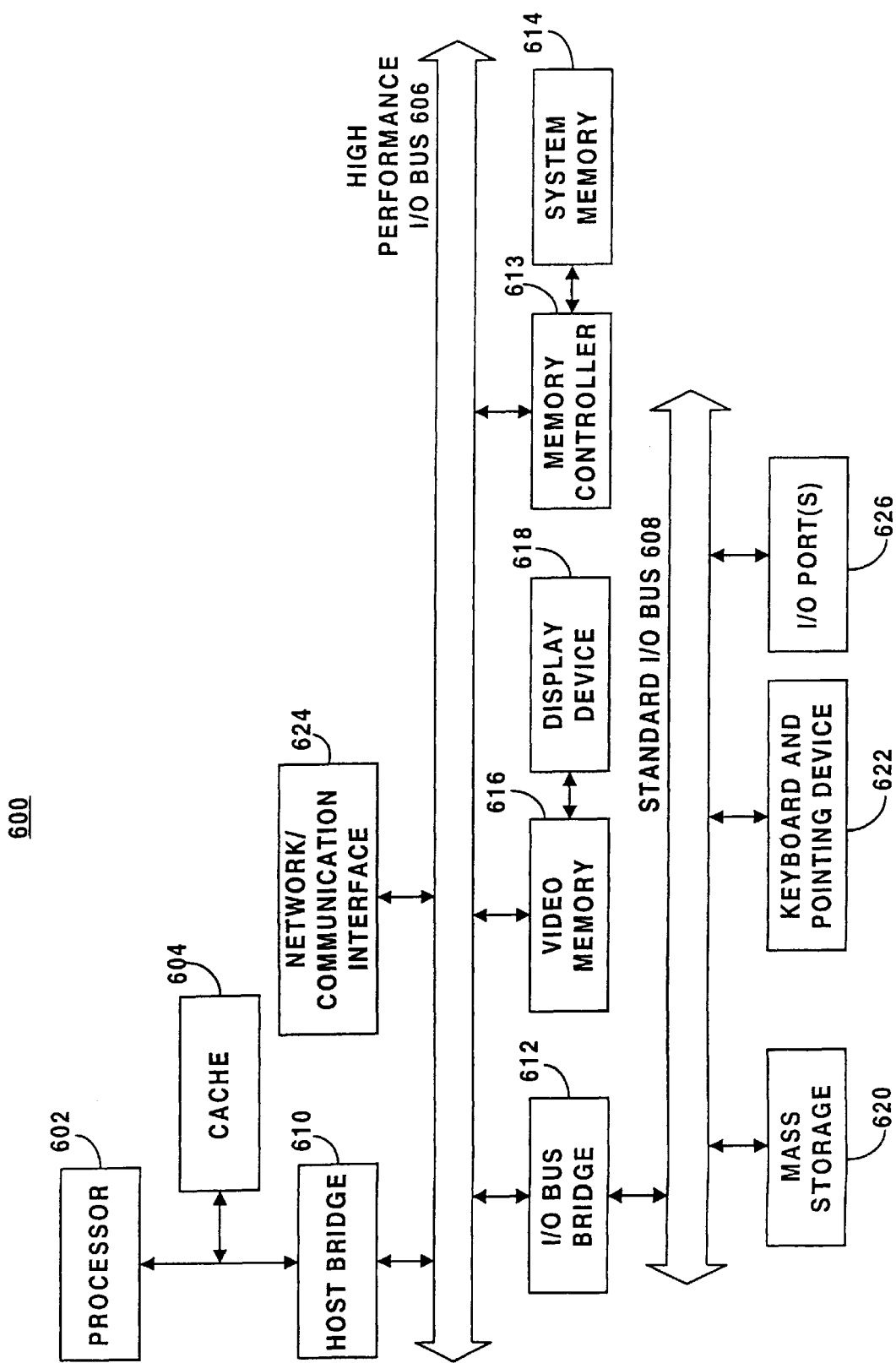
FIG. 6 illustrates a hardware system or machine such as may be used with one embodiment of the present invention.

FIG. 6 illustrates a hardware system or machine such as may be used with one embodiment of the present invention. In the illustrated embodiment, hardware system 600 includes processor 602 and cache memory 604 coupled to each other as shown. Additionally, hardware system 600 includes high performance input/output (I/O) bus 606 and standard I/O bus 608. Host bridge 610 couples processor 602 to high performance I/O bus 606, whereas I/O bus bridge 612 couples the two buses 606 and 608 to each other. Coupled to bus 606 are network/communication interface 624, system memory 614 (as controlled by memory controller 613), and video memory 616. In turn, display device 618 is coupled to video memory 616. Coupled to bus 608 is mass storage 620, keyboard and pointing device 622, and I/O ports 626. Collectively, these elements are intended to represent a broad category of hardware systems, including but not limited to general purpose computer systems based on the PowerPC® processor family of processors available from Motorola, Inc. of Schaumburg, Ill., or the Pentium® processor family of processors available from Intel Corporation of Santa Clara, Calif.

These elements 602–626 perform their conventional functions known in the art. In particular, network/communication interface 624 is used to provide communication between system 600 and any of a wide range of conventional networks, such as an Ethernet, token ring, the Internet, etc. It is to be appreciated that the circuitry of interface 624 is dependent on the type of network the system 600 is being coupled to.

Mass storage 620 is used to provide permanent storage for the data and programming instructions to perform the above described functions of comcryption, whereas system memory 614 is used to provide temporary storage for the data and programming instructions when executed by processor 602.

I/O ports 626 are one or more serial and/or parallel communication ports used to provide communication between additional peripheral devices which may be coupled to hardware system 600.

It is to be appreciated that various components of hardware system 600 may be rearranged. For example, cache 604 may be on-chip with processor 602. Furthermore, certain implementations of the present invention may not require nor include all of the above components. For example, mass storage 620, keyboard and pointing device 622, and/or display device 618 and video memory 616 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, storage devices, or memories.

In one embodiment, comcryptor 100 of FIG. 1 is implemented as a series of software routines run by a hardware system 600 of FIG. 6. These software routines comprise a plurality or series of instructions to be executed by a processor in a hardware system, such as processor 602 of FIG. 6. Initially, the series of instructions are stored on a storage device, such as mass storage 620. It is to be appreciated that the series of instructions can be stored on any conventional storage medium, such as a diskette, CD-ROM, magnetic tape, DVD (DVD is currently used as an acronym for digital video disk; however, it appears that the usage is being changed to digital versatile disk to reflect the ability of DVD technology to be used for data other than video), laser disk, ROM, Flash memory, etc. It is also to be appreciated that the series of instructions need not be stored locally, and could be received from a remote storage device, such as a server on a network, via network/communication interface 624.

The instructions are copied from the storage device, such as mass storage 620, into memory 614 and then accessed and executed by processor 602. In one implementation, these software routines are written in the C++ programming language. It is to be appreciated, however, that these routines may be implemented in any of a wide variety of programming languages.

In alternate embodiments, the present invention is implemented in discrete hardware or firmware. For example, in one alternate embodiment, an application specific integrated circuit (ASIC) is programmed with the above described functions of the present invention.

According to one embodiment of the present invention, each of the compression algorithms which are available for use by comcryptor 100 in compressor set 105 of FIG. 1 is a lossless compression algorithm. In lossless compression, the "size" of the data block being compressed is reduced without losing any of the data. That is, the data block can be compressed, stored or transferred, then decompressed, and the decompressed data block will be identical to the original data block. In alternate embodiments, compressor set 105 includes lossy compression algorithms. In lossy compression, the size of the data block is reduced and a small amount of data loss occurs. Thus, a data block which is compressed, stored or transferred, and then decompressed will be slightly different from the original data block. Although lossy compression causes some data loss, that data loss is typically not evident to the user for certain types of data, such as image data.

In the discussions above embodiments are described which use "move-forward" compression algorithms. It should be noted that alternate embodiments can include different types of compression algorithms, or a combination of move-forward compression algorithms and different types of compression algorithms.

Thus, a method and apparatus for simultaneously encrypting and compressing data has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method for simultaneously encrypting and compressing input data, the method comprising:

identifying an encryption key;

using the encryption key to determine a value for a variable in a compression algorithm, the value identifying one compression algorithm from a set of compression algorithms defined by a set of values for the variable; and compressing first data of the input data according to the one compression algorithm, wherein compressing the first data with the one compression algorithm as identified by the encryption key simultaneously encrypts the first data without the use of a separate encryption algorithm.

2. The method of claim 1, wherein the first data comprises a single character.

3. The method of claim 1, wherein the first data comprises all of the input data.

4. The method of claim 1, wherein using the encryption key comprises using a single bit of the encryption key to identify the one compression algorithm from the set of compression algorithms.

5. The method of claim 4, further comprising:

using the encryption key to determine a second value for the variable to identify a second compression algorithm from the set of compression algorithms; and compressing second data of the input data according to the second compression algorithm.

6. The method of claim 1, wherein the set of compression algorithms comprise a plurality of move-forward compression algorithms.

7. The method of claim 6, wherein an amount the first data is to be moved forward according to the plurality of move-forward compression algorithms is dependent on a single bit, corresponding to the first data, of the encryption key.

8. The method of claim 1, further comprising permuting the first data prior to compressing the first data.

9. An apparatus for simultaneously encrypting and compressing input data, the apparatus comprising:
   a compressor set which includes a plurality of compression algorithms defined by a set of values for a variable in a compression algorithm; and
   a comcryptor to identify one compression algorithm of the plurality of compression algorithms based at least in part on using an encryption key to determine the value of the variable and to compress first data of the input data according to the one compression algorithm, wherein compressing the first data with the one compression algorithm as identified by the encryption key simultaneously encrypts the first data without the use of a separate encryption algorithm.

10. The apparatus of claim 9, wherein the first data comprises a single character.

11. The apparatus of claim 9, wherein the first data comprises all of the input data.

12. The apparatus of claim 9, wherein the comcryptor is further operative to use a single bit of the encryption key to identify the one compression algorithm of the plurality of compression algorithms.

13. The apparatus of claim 12, wherein the comcryptor is further operative to use the encryption key to determine a second value of the variable to identify a second compression algorithm of the plurality of compression algorithms, and to compress second data of the input data according to the second compression algorithm.

14. The apparatus of claim 9, wherein the plurality of compression algorithms comprise a plurality of move-forward compression algorithms.

15. The apparatus of claim 14, wherein an amount the first data is to be moved forward according to the plurality of move-forward compression algorithms is dependent on a single bit, corresponding to the first data, of the encryption key.

16. The apparatus of claim 9, wherein the comcryptor is further operative to permute the first data prior to compressing the first data.

17. A machine-readable medium having stored thereon a plurality of instructions, designed to be executed by a processor, for implementing a function to:
   identify an encryption key;
   use the encryption key to determine a value for a variable in a compression algorithm, the value identifying one compression algorithm from a set of compression algorithms defined by a set of values for the variable; and
   compress first data according to the one compression algorithm, wherein compressing the first data with the one compression algorithm as identified by the encryption key simultaneously encrypts the first data without the use of a separate encryption algorithm.

18. The machine-readable medium of claim 17, wherein the first data comprises a single character.

19. The machine-readable medium of claim 17, wherein the function to use the encryption key comprises using a single bit of the encryption key to identify the one compression algorithm from the set of compression algorithms.

20. The machine-readable medium of claim 19, wherein the function is further operative to:
   use the encryption key to determine a second value for the variable to identify a second compression algorithm from the set of compression algorithms; and
   compress second data according to the second compression algorithm.

21. The machine-readable medium of claim 17, wherein the set of compression algorithms comprise a plurality of move-forward compression algorithms.

22. The machine-readable medium of claim 21, wherein an amount the first data is to be moved forward according to the plurality of move-forward compression algorithms is dependent on a single bit, corresponding to the first data, of the encryption key.

23. The machine-readable medium of claim 17, wherein the function is further operative to permute the first data prior to compressing the first data.

* * * * *